July 24, 1928.
W. H. CLARKE ET AL
1,678,329
PICK-UP VEHICLE BODY AND METHOD OF HANDLING GOODS
Filed July 27, 1921
3 Sheets-Sheet 1
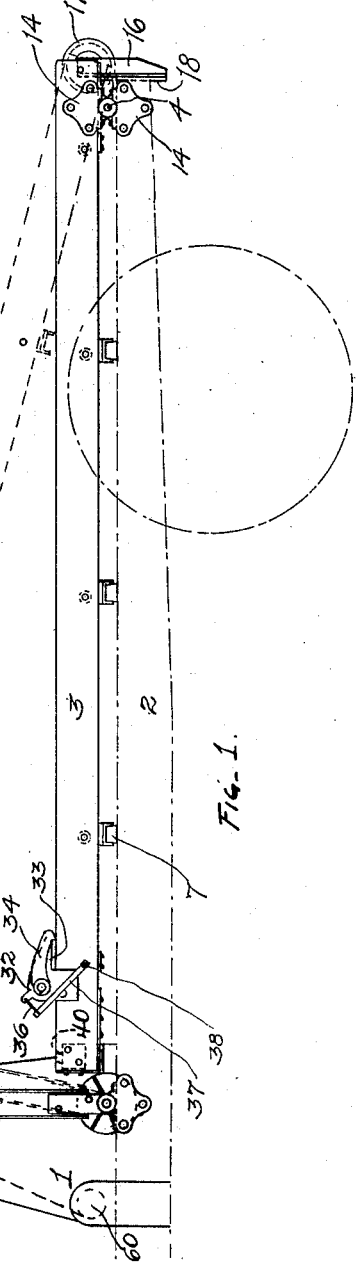
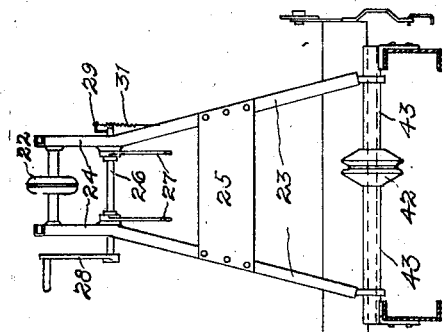
INVENTORS
William H. Clarke and
Byron G. Cook,
BY
Fay, Oberlin & Fay,
ATTORNEYS.

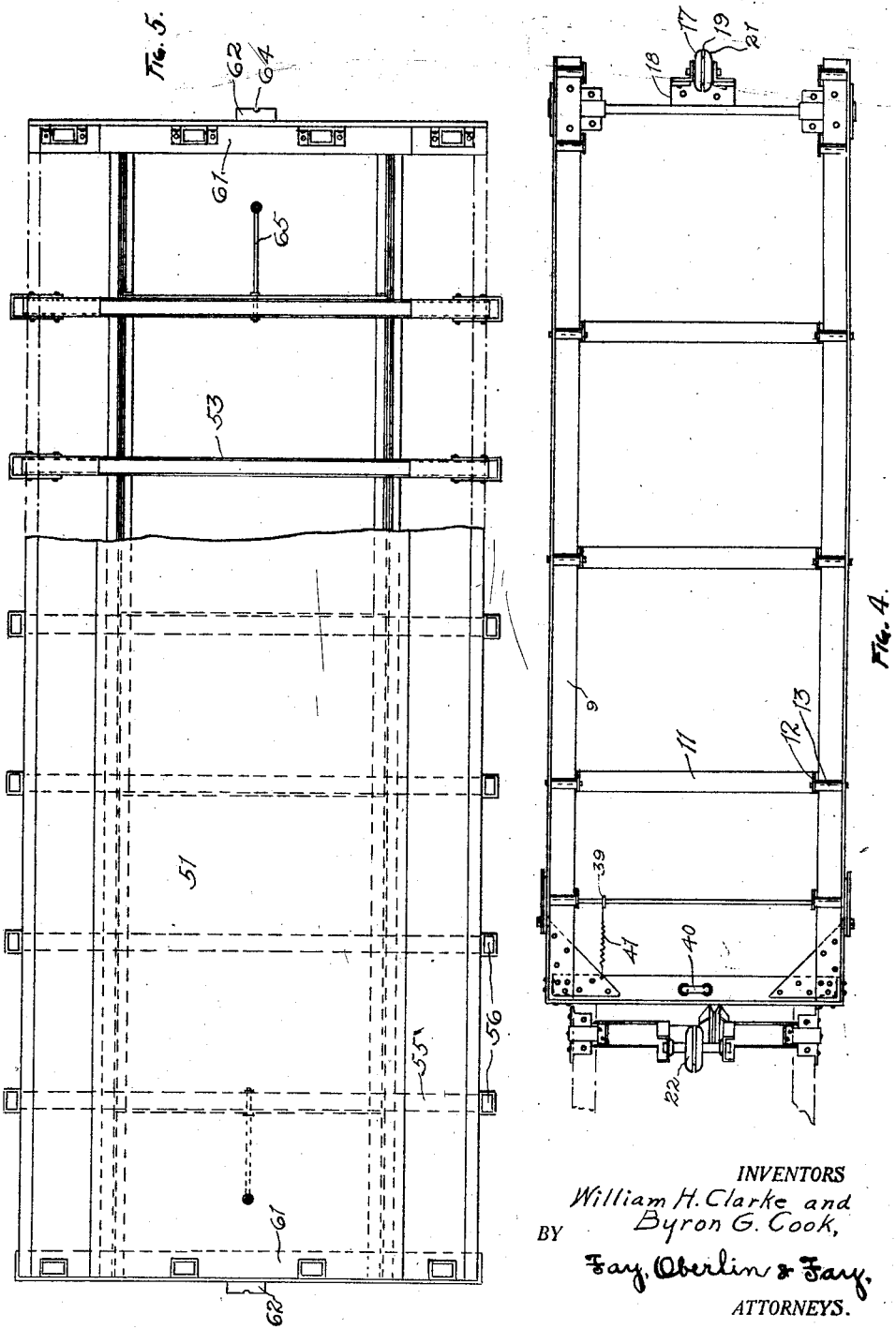

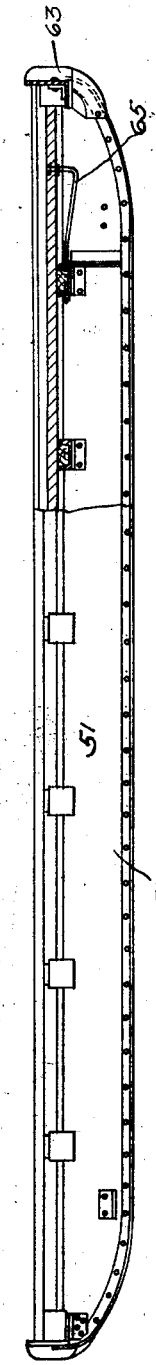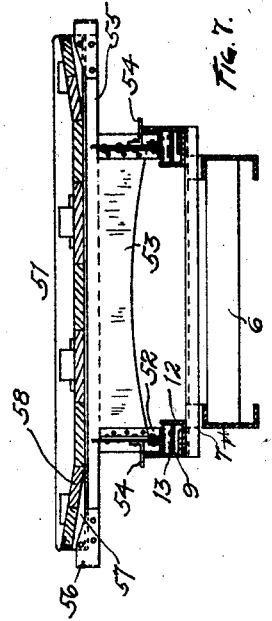

Patented July 24, 1928.

1,678,329

UNITED STATES PATENT OFFICE.

WILLIAM H. CLARKE AND BYRON G. COOK, OF LAKEWOOD, OHIO.

PICK-UP VEHICLE BODY AND METHOD OF HANDLING GOODS.

Application filed July 27, 1921. Serial No. 487,972.

This invention relates to a pick-up vehicle body and a method of handling articles by truck. More particularly it sets forth a combined truck and removable body and the means for and method of releasing said body and returning the same to position.

In truck bodies of the removable type as heretofore designed, difficulty has been experienced in handling the same without a specially prepared platform or some similar facility for receiving the removable body as it leaves the truck chassis. Frequently elaborate special stations are provided, for certain types of removable bodies, equipped with cranes, tracks and similar appliances for handling said bodies.

The object of our invention is to provide a removable truck body which can be deposited wherever desired, particularly upon any kind of broken or muddy ground that the truck itself can travel over, and to provide the chassis with self-contained means for transferring the body from its position on the ground to a position on the truck chassis for transportation, and for transferring the body from the truck chassis to the ground again at will. Other objects will appear in the course of the following description.

It is of course intended that a single truck may be equipped with a series of removable bodies so that the truck can be transporting one of said bodies when loaded, while the remaining bodies are being filled with material, and the running time of the truck can thus be kept at the maximum possible amount. Also a number of removable bodies may be nested and transported at one time. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of my invention may be used.

In said annexed drawings: Fig. 1 is a view in side elevation showing the pin column and sub-frame applied to a truck; Fig. 2 is a rear elevation of the pin column; Fig. 3 is an elevation of the rearward portion of the construction illustrated in Fig. 1; Fig. 4 is a top plan view of the parts shown in Fig. 1; Fig. 5 is a plan view of the removable body, a portion of the floor thereof being removed to show the supporting members; Fig. 6 is a side elevation of the removable body, parts thereof being shown in section; Fig. 7 is a cross section of the removable body in position upon the sub-frame with the latter supported in lowered position upon the main frame of the truck; Fig. 8 is an end elevation of the removable body; Fig. 9 is a diagrammatic side elevation showing a modified construction wherein the pin column and sub-frame are dispensed with; and Fig. 10 is a plan view showing the winch utilized with the modified construction.

In said annexed drawings as shown, particularly in Fig. 1 thereof, the truck 1 has a main frame 2 which is provided with a sub-frame 3 connected therewith by means of a pivot 4, adjacent its rear end. The sub-frame extends forwardly from its pivot point to a position in back of the driver's seat at which point a pin column 5 is pivotally mounted on the truck frame, said pin column supporting flexible elements for changing the position of the sub-frame in a manner to be hereinafter described.

The truck frame 2 may be provided with a series of transverse bracing, and supporting members 6 and blocks 7, preferably of wood, may be secured to the upper side thereof. A series of channel irons are fastened to the under side of the sub-frame in position to register over said blocks when the sub-frame is in lowered position. The sides 9 of the sub-frame are preferably formed of angle iron members with their base portions turned inwardly and are rigidly braced by a series of transverse members 11, above which, by means of suitable brackets 12, a series of rollers 13, are rotatably supported so as to provide a rolling contact for the skids or runners of the removable body hereinafter to be described. These rollers are located preferably at positions above and in alignment with the sub-frame cross members heretofore referred to in order to secure greater rigidity without undue weight of material.

The pivot for attaching the sub-frame to the body is preferably formed of a shaft journaled in a pair of special metal brackets 14 secured to the respective frames.

Centrally of the end member, 15, of the truck frame, a bracket 16 is mounted which carries a roller sheave 17. The bracket is rigidly secured to the end frame member by means of angle plates 18, and the roller sheave therein is carried at the upper end of said bracket in a position to cooperate with the removable body to be carried on the sub-frame of the truck, in a manner hereinafter to be described. The roller sheave carries a central groove 19 to receive the flexible element for the handling of the removable body, and the edges 21 of the sheave are rounded, a cross section thereof presenting an elliptical contour.

A sheave wheel 22 of the character just described is also mounted at the upper end of the pin column. The pin column as shown in Fig. 2, is preferably formed of two side members 23 inclined upwardly toward each other and having their extreme upper ends 24, in spaced parallel relation. A cross plate 25 serves to hold said members in rigid relation. Adjacent the position of said sheave near the upper end of the pin column (see Fig. 2), a shaft 26 carrying a pair of sub-frame hooks 27 is journaled, said shaft having a hand lever 28 at one end and a spring connection lever 29 at the other end with which co-acts a coiled spring 31 attached to the frame and serving to hold the sub-frame hooks in either engaging or disengaged positions (see Figs. 1 and 2). The upper end of the pin column, as shown in Fig. 1, is angularly related to its main body portion so that when the sub-frame is in lowered position the main body portion of the pin column is vertically disposed, but when the sub-frame is raised to its topmost position, the angular portion thereof is in approximately a vertical position, while the lower portion inclines toward the rear of the truck.

A locking device, for the removable body, is provided at the forward end of the sub-frame and comprises a pair of stop hooks 32 on opposite sides of the upper portion of the sub-frame, having their rearwardly extended nose portions 33 spaced from the upper surface of the sub-frame so as to permit the passage of angle body lock brackets hereinafter to be described. Upon each stop hook a latch 34 is pivotally mounted, having an upwardly extending ear 35 to which is attached a link 36 connected with a crank-arm 37 mounted on a shaft 38 extending across the sub-frame. The latch shaft carries a spring lever 39, to the free end of which a coil spring 41, secured at its other end of the frame is attached. A U-bolt 40 is centrally secured to the forward end of the sub-frame (see Fig. 4) to serve as a point of attachment for the flexible element, whereby the sub-frame may be elevated in exactly the manner illustrated in Fig. 1, excepting that the cable is directly attached to the sub-frame instead of to a removable body latched to the sub-frame.

The pin column as stated, is pivotally mounted on the truck frame by means of a shaft. Upon said shaft an idler sheave wheel 42 is rotatably mounted a pair of tubular spacing sleeves 43 being associated therewith. The flexible element 50 for handling the removable body is designed to engage the grooves of the respective sheave wheels and to be taken up upon a windlass 60 of standard character, preferably a power winch operated from the power transmission means of the truck.

The removable body 51 which has been found most suitable for use in conjunction with truck construction just described, is one of the character of a stone-boat, having runners 52 of I-beams curved upwardly at the ends and held in rigid position by means of a series of rigid cross members 53 spaced at intervals of the length thereof. Adjacent the respective ends of said runners, body locking brackets 54 are secured to the sides thereof, the horizontal portions extending outwardly a sufficient distance to engage the positioning and latching members upon the sub-frame. Sill-channels 55 are secured adjacent to the upper sides of the runners and the outer ends thereof are provided with stake pockets 56. Wedge pieces 57 may be positioned adjacent the outer ends of the sill-channels for supporting the flooring 58 at a slight inclination at the marginal portions of the removable body. At the ends of the removable body, end pieces 61, of heavy material are secured, stake pockets being also provided therein at suitably spaced intervals. Upon the outer side of each of the said end pieces, a nose piece 62 is secured, said nose piece, as shown in Fig. 8, comprising a bracket element 63 formed with a concave groove 64 on its forward and under side of a size suitable to receive and engage the rollers upon the truck and to receive and position the flexible element for handling said body, when the same is secured to tow rod or loop 65, secured to the structure immediately at the rear of said nose piece. The nose piece and tow rod may be applied to only one end of the removable body when no occasion for handling said body in reversed position is in view.

From the foregoing description it is believed the operation of this apparatus will be readily apparent. When it is desired to unload from the truck the removable body with its cargo of material, the flexible element from the winch, which is normally maintained in connection with the loop at the forward end of the removable body from the time of placing the same upon the truck, is actuated through the power plant and winch. This elevates the end of the sub-frame adjacent the driver's seat or cab. As the sub-frame rises the pin column will swing from a perpendicular position to one inclined toward the rear of the truck. When the sub-frame has reached a position adjacent the top of the pin column, the latch shaft is operated by means of a lever and the hooks thereon engage the end member of the sub-frame and securely hold the same against the tendency to return to its original position. By lifting of sub-frame latch lever 34 and releasing the drum 60 (see Fig. 1), the removable body will by force of gravity slide down the inclined sub-frame until its rearward end strikes the ground at a gentle incline. By driving the truck forward at this time and controlling the action of the drum, the forward end of the removable body may be gradually lowered to the ground without injury to the contents of such body. The cooperation of the flexible element with the nose piece and the grooves in the roller shafts, insures the proper positioning of the parts during the operation described.

When it is desired to load a removable body on a truck, the operation just described is reversed. The sub-frame if not already in raised position, may first be lifted to proper latched position by means of the flexible element engaged through the U-bolt 40, as heretofore described. (See Figs. 1 and 4.) This element is thereafter attached to the tow rod loop upon the forward end of the removable body, and, by means of this element, being guided through the channeled nose piece and grooved sheave wheels, when tension is applied to the flexible element, the parts will be properly lined up without particular attention being given to the exact alinement of the truck and body prior to commencing the loading operation. In the event that the removable body is upon rough ground and at an extreme angle to the truck body proper, it may be found desirable to drive the truck a short distance towing the removable body which is then drawn into line with the truck body and is ready for the operation of raising it to a position upon the sub-frame. After the drawing-in operation is completed, the body locking brackets 54 thereon are positioned beneath the stop hooks 32, and engaged by the end latches 34 on the sides of the sub-frame and are securely held against dislodgement. The latch on the pin column is then actuated to release the sub-frame and upon the general releasing of the windlass, the sub-frame may be gradually lowered to its position upon the truck frame proper.

In the modified form of construction illustrated in Figs. 9 and 10 of the drawing, the sub-frame is dispensed with and the body is loaded upon and unloaded from the main frame of the truck by means of a pair of flexible elements, 71, 72, carried upon a pair of drums 73, 74, of a power winch 75, and adapted to engage the roller sheave 17, from above and below, respectively, as the body is moved on and off the truck. The winch is actuated through a clutch and transmission 76 of standard type from a power take-off 77 on the power transmission mechanism of the truck. Each drum is provided with a friction plate 78 to prevent overrunning when it is operating idly, that is to say, the plate acts as a brake to prevent faster linear travel of a point on the circumference of the drum than the rate of outward travel of the cable.

A guide pulley 79, mounted beneath the roller sheave 17, at the end of the main frame of the truck, serves to maintain the flexible element 72, in position to engage said sheave as the body is drawn upon the truck, the clutch mechanism of the winch being shifted during this operation.

The removable body used with the modified type of construction is preferably equipped with a U-bolt 81 in place of the tow rod loop 65 ordinarily provided as the point of attachment for the flexible elements.

Other modes of applying the principle of our invention may be employed instead of the one explained, change being made as regards the mechanism and method herein disclosed, provided the means and steps stated by any of the following claims or the equivalent of such stated means or steps be employed.

We therefore particularly point out and distinctly claim as our invention:—

1. The process of transferring freight from the ground level to a truck for transportation and redelivery to the ground level, which comprises the steps of assembling the freight upon a removable body section of said truck, hoisting and positioning said body section, from any angle relatively to said truck from the ground level, upon said truck by a single continuous load lifting operation, transporting said freight to the point of delivery, releasing and unloading said body section from the truck through a single continuous load lifting operation, and unloading the freight from the body section.

2. In an apparatus of the class described, the combination of a motor truck, a removable body for said truck adapted to be deposited upon and hoisted from the ground, coacting guiding elements mounted respectively upon said truck and body along a central longitudinal line thereof, and a flexible element co-acting with said guiding elements for hoisting and positioning said body upon said truck.

3. A removable vehicle body comprising a platform, a pair of runners secured to said platform and a combined cable guide and sheave engaging nose piece mounted centrally of the end of said body.

4. A removable vehicle body comprising a pair of runners, secured to said platform, a combined cable guide and sheave engaging nose piece mounted centrally of the end of said body, and a cable attaching loop mounted on the underside of said body adjacent and in alinement with said guide and sheave engaging nose piece.

Signed by us this 6th day of July, 1921.

WILLIAM H. CLARKE.
BYRON G. COOK.